(12) United States Patent
Champoux et al.

(10) Patent No.: US 7,571,544 B2
(45) Date of Patent: Aug. 11, 2009

(54) PROCESS AND DEVICE FOR MEASURING AND ADJUSTING THE ANGULAR MOVEMENT OF A FASTENING CLEAT ON A CLIPLESS PEDAL

(75) Inventors: Yvan Champoux, Sherbrooke (CA); Jean-Marc Drouet, Fleurimont (CA); Simon Richard, Sherbrooke (CA)

(73) Assignee: Look Cycle International, Nevers (FR)

( * ) Notice: Subject to any disclaimer, the term of this patent is extended or adjusted under 35 U.S.C. 154(b) by 74 days.

(21) Appl. No.: 11/667,383

(22) PCT Filed: Nov. 15, 2005

(86) PCT No.: PCT/FR2005/002831

§ 371 (c)(1),
(2), (4) Date: Jul. 26, 2007

(87) PCT Pub. No.: WO2006/053977

PCT Pub. Date: May 26, 2006

(65) Prior Publication Data

US 2008/0040937 A1 Feb. 21, 2008

(30) Foreign Application Priority Data

Nov. 16, 2004 (CA) .................................... 2485324

(51) Int. Cl.
*G01B 3/56* (2006.01)
*B62M 3/08* (2006.01)
(52) U.S. Cl. .......................................................... 33/1 N
(58) Field of Classification Search .................. 33/1 N, 33/3 R, 6, 533, 534, 538, 613, 645; 73/865.3, 73/865.8
See application file for complete search history.

(56) References Cited

U.S. PATENT DOCUMENTS

| | | | | | |
|---|---|---|---|---|---|
| 1,436,111 | A | * | 11/1922 | Reich | 33/533 |
| 3,802,084 | A | * | 4/1974 | Fortado, Jr. | 33/520 |
| 4,771,548 | A | * | 9/1988 | Donnery | 33/512 |
| 5,862,716 | A | | 1/1999 | Bryne et al. | |
| 6,457,247 | B1 | * | 10/2002 | Lin | 33/471 |
| 2003/0163287 | A1 | * | 8/2003 | Vock et al. | 702/187 |

(Continued)

FOREIGN PATENT DOCUMENTS

DE 298 19 062 U1 10/1999

(Continued)

*Primary Examiner*—R. Alexander Smith
(74) *Attorney, Agent, or Firm*—Young & Thompson (57) ABSTRACT

A method and device for measuring and adjusting the angular movement of a fastening cleat on a clipless pedal, includes a motion detector which is fixed to the pedal to detect any angular movement in relation to the fastening cleat and transmit data to a data-processing device which calculates values of the angular movement as a function of time, and the average of the variations in the angular movement. The contactless motion detector includes a magnetic sensor which is fixed to the pedal, and is disposed facing a magnet that is fixed beneath the cleat and can detect any variation in the orientation of the magnetic field as a function of the angular movement of the cleat. The angular position of the fastening cleat is adjusted such that the average variation in the value of the free angular movement is returned to the median of the free angular movement range.

18 Claims, 5 Drawing Sheets

U.S. PATENT DOCUMENTS

2006/0248965 A1 * 11/2006 Wyatt et al. ............ 73/862.391
2007/0245835 A1 * 10/2007 Hauschildt ............. 73/862.391

FOREIGN PATENT DOCUMENTS

| | | | |
|---|---|---|---|
| EP | 0 393 585 A | 10/1990 |
| JP | 11-059527 A | 3/1999 |
| WO | 02/20094 A | 3/2002 |

* cited by examiner

PROCESS AND DEVICE FOR MEASURING AND ADJUSTING THE ANGULAR MOVEMENT OF A FASTENING CLEAT ON A CLIPLESS PEDAL

This invention relates to clipless bicycle pedals. More specifically, this invention relates to a device that allows the measurement of the angular movement of a fastening cleat of the shoe of a cyclist relative to the pedal, and consequently the angular movement between the shoe and the pedal.

BACKGROUND OF THE INVENTION

For more than a century, bicycles have been equipped with fixed pedals at the end of two cranks placed at 180 degrees to one another on each side of a frame or a wheel. The cyclist transfers his energy to the bicycle by means of the pedals. Many forms of pedals have been proposed over the years.

At the start of the twentieth century and to improve their performance, cyclists and above all competition cyclists, found it useful to attach the shoe to the pedal by means of various systems, such as, for example, toe-clips equipped with straps. In the mid-1980s, the company LOOK introduced a revolutionary pedal: the clipless pedal.

The clipless pedal makes it possible to easily attach the shoe to the pedal by simply pressing on the pedal. To disengage (remove the shoe), it is sufficient to pivot and force the heel to the outside. Since the shoes of the cyclist are no longer attached permanently to the pedals, the foot can release itself during a fall; at the time this was considered the primary advantage of the clipless pedal. This is the reason why the clipless pedal is also called a safety pedal.

DESCRIPTION OF THE RELATED ART

Since the advent of the LOOK pedal, several manufacturers have followed suit by proposing variants at the level of mechanisms and cleats. The principle of the clipless pedal is still the same today. All clipless pedals on the market are composed of two main parts:

a fastening plate or cleat fixed securely to the shoe by means of a screw;

a clipless pedal on which the cleat is fastened.

The first clipless pedals firmly joined the shoe to the pedal and no movement was allowed between these two pieces. The foot and the pedal were thus united and rotated solely around the axis that joins the pedal to the crank. Later, it was considered that a certain angular movement of the shoe relative to the pedal would have to be allowed to prevent excessive stress on the lower members, and especially on the knees.

A clipless pedal and a fastening cleat with suitable play were thus developed so as to allow angular movement of the cleat of several degrees during pedaling. This angular movement is also called angular freedom or angular floating. The means allowing this angular movement to be obtained are well known today and are disclosed, among others, in the European Patent EP 0 393 585 of the applicant. This patent, moreover, discloses a possibility of adjusting the value of this angular movement.

Several researchers have looked into the pedaling motion from a biomechanical standpoint. One of the objectives of research aims at minimizing the risks of injuries by wear, given the very repetitive nature of the movement. For example, an average cyclist rides 5000 km in one year; he will pedal 1 million times. Professional cyclists annually ride 25,000 km to 40,000 km.

Several parameters affect the pedaling motion: the height of the seat, its recoil, the cyclist's own morphology, the speed of execution, etc. It is recognized, however, that the position of the cleat on the shoe is a key parameter.

SUMMARY OF THE INVENTION

A device allowing measurement of the angular movement of the cyclist while he is pedaling comprises one of the objects of the innovation. This measurement is intended to help position the cleat on the shoe so that the cyclist can, among other things, transmit maximum power to the bicycle, optimally use the angular freedom offered by the pedals, avoid injuries and be comfortable.

Given that several parameters associated with the positioning of the cyclist on the bicycle affect pedaling, it is advantageous that the cyclist can use this device on his own bicycle. Thus, reference is made here to measurement on the terrain because the measurement is taken on the bicycle of the cyclist under operating conditions that are as near as possible to reality.

Moreover, merchants specializing in bicycles or professional bicycle outfitters would like to have this technology to adjust the position of the cleats by having the cyclist pedal on a "home trainer" in their store.

Moreover, the biomechanical researcher who studies pedaling will likewise want to use the device on the road to obtain behavior linked to different training conditions.

One object of the invention is to suggest a process of measuring and adjusting the angular position of a fastening cleat of the shoe of a cyclist on a clipless pedal. According to the invention the process is characterized by the fact that it comprises the following phases consisting in:

a) fixing said fastening cleat in an approximate angular position under said shoe of the cyclist and fastening it to said clipless pedal;

b) providing a free angular movement of said fastening cleat around an essentially vertical pivoting axis during pedaling;

c) determining the range of said free angular movement;

d) measuring variations of the value of said free angular movement over time while pedaling;

e) calculating the average of the variations of the value of said free angular movement;

f) adjusting said angular position of said fastening cleat such that said average of the variations of the value of said free angular movement are brought to the median of said range of said free angular movement.

According to other characteristics of this process:

for implementing phase f), a correction value is obtained by subtracting said median from said average of the variations of the value of said free angular movement;

for implementing phase f), a first reference point is placed under the shoe immediately behind said cleat and centered on it, and a second reference point is placed centered on the heel of the shoe to allow adjustment of said angular position of said fastening cleat using a protractor means suited to said fastening cleat;

the variations of the value of said free angular movement over time during pedaling are recorded in an onboard recording means;

the variations of the value of said free angular movement over time during pedaling are transmitted wirelessly to a computation device.

Another object of this invention is to suggest a device for measuring the angular position of a fastening cleat of the shoe of a cyclist on a clipless pedal. According to the invention, this device is characterized by the fact that it comprises a motion detector attached to the pedal and able to continuously detect any angular movement of said fastening cleat around a pivoting axis on the pedal and to transmit the data to a data processing device that calculates the values of said angular movement as a function of time, as well as the average of the variations of said angular movement over time.

According to other characteristics of this measurement device:

said detector is a proximity motion detector;

said detector comprises a magnetic sensor attached to the pedal and arranged with respect to at least one magnet fixed under said cleat and able to detect any variation of the orientation of the magnetic field as a function of an angular movement of said cleat;

several magnets are positioned symmetrically relative to the pivoting axis of the cleat;

said processing device comprises an onboard electronic module able to carry out a preliminary processing of the measurement data, said electronic module being powered from an onboard power source;

said electronic module comprises a data storage memory;

said electronic module can wirelessly transmit the processed data to a measurement data processing and display device;

said measurement device is linked to an adjusting device that can be connected to the cleat so as to indicate the initial angular position of the cleat fixed under the shoe and allow exact correction of this position;

said adjustment device comprises a protractor with an intersection point of the convergent lines representing the degrees corresponding to the pivoting axis of the cleat;

said protractor uses a first and a second reference point plotted under the shoe, allowing identification of the initial angular position of the cleat, the first reference point being placed near the cleat, centered directly behind it, and the second on the heel of the shoe and centered on it;

said protractor comprises on its front end a recess with a shape adapted to the back part of the cleat, and that said protractor is connected to the cleat using an elastic band that in its median part is connected to a rigid elongated element comprising a groove constituting a housing for the front end of the cleat.

BRIEF DESCRIPTION OF THE DRAWINGS

Other objectives, advantages and characteristics of this invention will become clear from the following description relative to one illustrative embodiment of the invention shown in the accompanying figures, in which.

DETAILED DESCRIPTION OF THE PREFERRED EMBODIMENTS

The illustrative embodiment of this invention will now be described purely by way of indication. Analogous or similar elements in the various figures will bear the same reference numbers.

The embodiment shown in the figures illustrates the process and the device for measurement and adjustment according to the invention that is used to adjust the angular position of the fastening cleat of the shoe of a cyclist on a clipless pedal.

Figure 1:
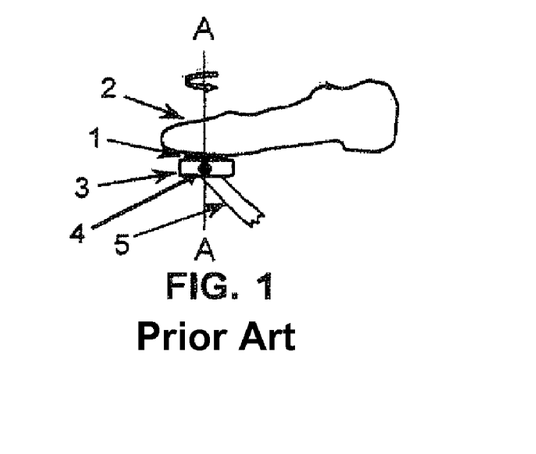
FIG. 1 is a very schematic elevation view of a shoe placed on a clipless pedal.

FIG. 1 shows the primary elements that allow transmission of the exertion of the cyclist to a bicycle that is equipped with a clipless pedal. A fastening cleat 1 is attached securely under the shoe of a cyclist 2 by means of a screw, for example; other methods of attachment can, of course, be envisioned. This cleat 1 ensures a link to a clipless pedal 3 and is attached to the latter by means of a simple mechanical system that is often equipped with one or more springs.

This mechanism makes it possible to attach the cleat 1 or to release it (remove the shoe) at will. It is enough for the cyclist to force the heel toward the outside with great amplitude of pivoting to remove the shoe. This mechanism is well known in this field and will not be described in more detail since it does not apply directly to the invention.

The clipless pedal 3 is rotationally mounted on the pedal axis 4 that is connected to the crank of the chain mechanism 5.

Figure 2:
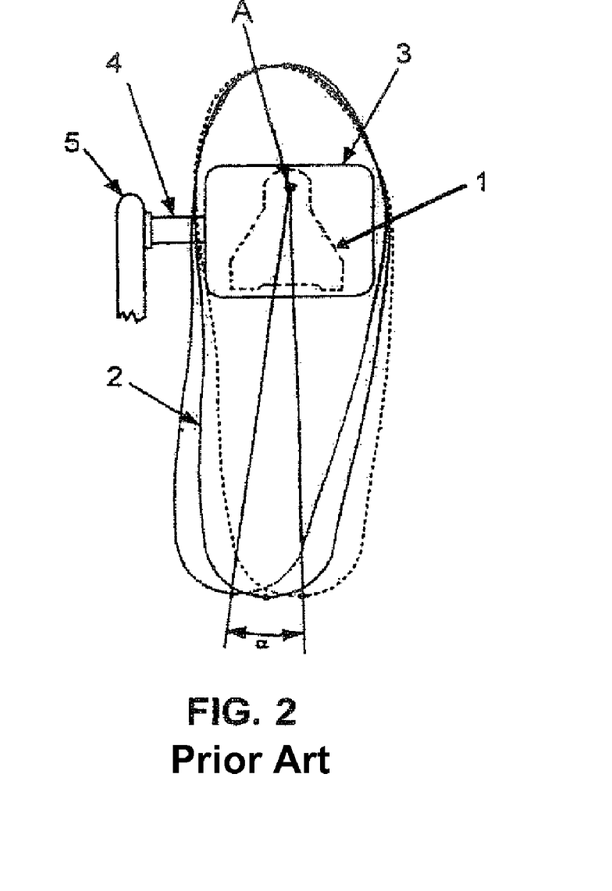
FIG. 2 is a very schematic bottom view illustrating the angular movement between the shoe of a cyclist and a pedal measured by the device that is the object of this invention.

FIG. 2 schematically shows a bottom view of the pedal. The end positions of the angular movement of the shoe of the cyclist 2 are shown in dotted lines. Because the shoe 2 is joined to the cleat 1, the angular movement is actually closely tied to a free angular movement of the fastening cleat 1 around one pivoting axis A-A that is essentially perpendicular to the plane of the pedal 3. The end positions of the angular movement of the shoe of the cyclist 2 actually correspond to the end values of the range of free angular movement of the cleat, i.e., the angular positions of the cleat in which it begins to initiate removal of the shoe while pushing—in the manner known in the art—an elastic fastening element to the rear of the pedal (shown in FIG. 5). This angular range is shown by the angle α in FIG. 2.

This free angular movement or clearance thus allows the foot of the cyclist to pivot around the axis A-A that is likewise essentially perpendicular to the support surface of the pedal 3. The rear of the shoe 2 can thus move angularly from left to right while pedaling.

The amplitude of this angular movement is limited by the cleat's coming into contact, to the left or to the right, with surfaces that form ramps on the elastic fastening element.

Moreover, the amplitude of the free angular movement offered by the pedals is not always the same from one model of a pedal to another and from one manufacturer to another. Certain pedals typically offer a maximum clearance of 9°, i.e., ±4.5°, whereas others offer a clearance of 15°. Certain pedals are provided with an adjustment that allows the cyclist to modify the maximum amplitude of the angular movement allowed by the pedal (see, for example, Patent EP 0 393 585 of the applicant).

Figure 3:
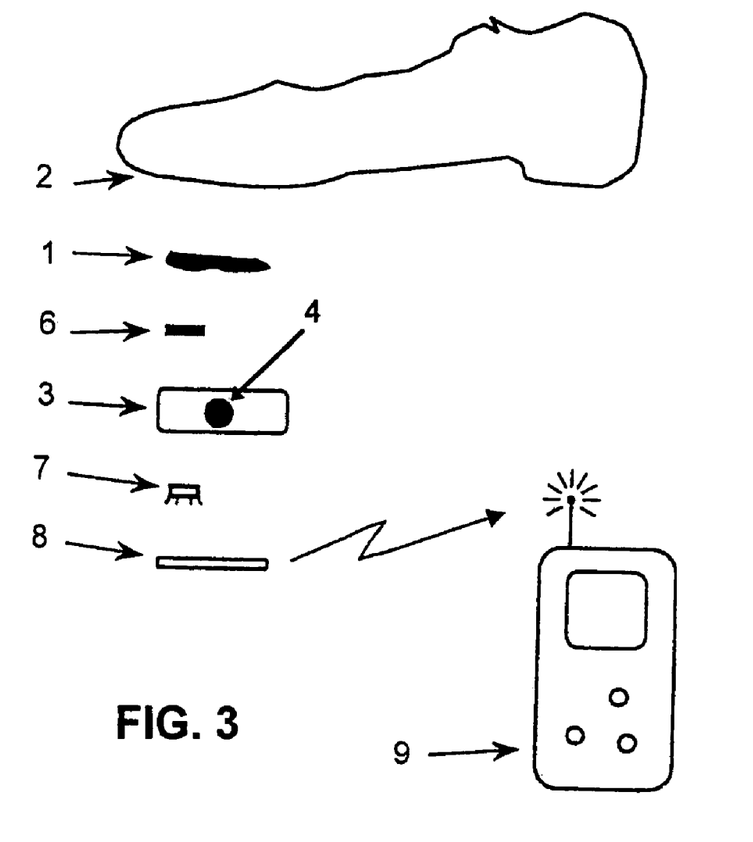
FIG. 3 shows very schematically in an exploded side view the elements of the device and a data acquisition concept according to one embodiment of this invention.
Figure 4:
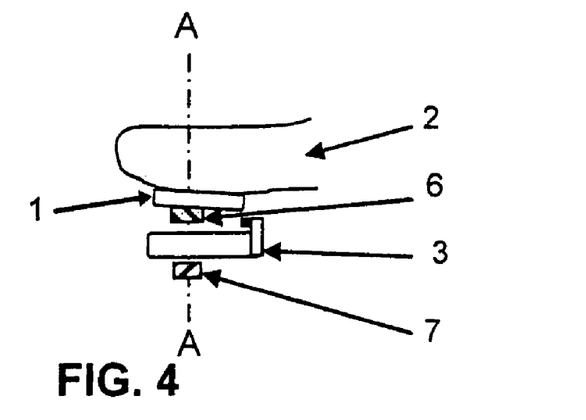
FIG. 4 shows a schematic side view illustrating the elements of the device that are closer to one another.

FIGS. 3 and 4 illustrate one embodiment of a measurement device according to this invention. A transmitter in the form of a magnet 6 is attached to the cleat 1 that itself is attached to the shoe 2. One or possibly several magnets 6 can thus be attached to the cleat 1 or even to the shoe 2.

The magnet 6 produces a magnetic field that can be detected by a proximity motion detector in the form of a magnetic sensor 7 that is attached to the pedal 3. The sensor 7 is attached to the pedal 3 on the pivoting axis A-A of the cleat 1. The sensitivity of the sensor 7 is nonlinear and is a function of the square cosine ($\cos^2 \theta$) of the angle $\theta$ between the axis of the magnetic field and the sensor 7. Suitable orientation of the sensor allows use of a relatively linear part of the sensor for zeroing.

When the cleat 1 is engaged in the pedal 3, the magnet 6 is near the magnetic sensor 7 and thus forms a magnetic field around the sensor 7. The latter is very sensitive to any variation of the orientation of the magnetic field. The magnet 6 thus forms a magnetic field with a sufficient intensity at the level of the sensor 7 attached to the pedal 3. The magnet must be oriented optimally relative to the axis of sensitivity of the sensor 7.

In the case of several magnets 6, they are positioned symmetrically relative to the pivoting axis of the cleat 1. A space of at least 4 mm separates the surface of the magnets from the surface of the sensor 7. This allows the shoe 2 to be placed on the pedal and removed while ensuring a sufficient magnetization level.

An angular movement of the foot of the cyclist causes pivoting of the shoe 2, of the cleat 1 and of the magnet 6 relative to the magnetic sensor 7 attached to the pedal 3. The pivoting of the magnet 6 thus causes a variation of the orientation of the magnetic field that is measured by the magnetic sensor 7.

This variation of the orientation of the magnetic field is detected by the sensor 7 and is electronically processed by the components of an electronic module 8 attached to the pedal 3. This process is a preliminary processing that leads to the generation of a signal that is transmitted wirelessly to a data processing and display device 9. Wirelessly means any mode of wireless transmission such as, for example, by radio waves, infrared, etc.

The electronic module 8 is supplied by a battery (not shown) carried on the module. This device is portable and can be transported by the cyclist for measurement on the terrain.

The electronic module advantageously comprises a data storage memory that makes it entirely self-contained.

Figure 5:
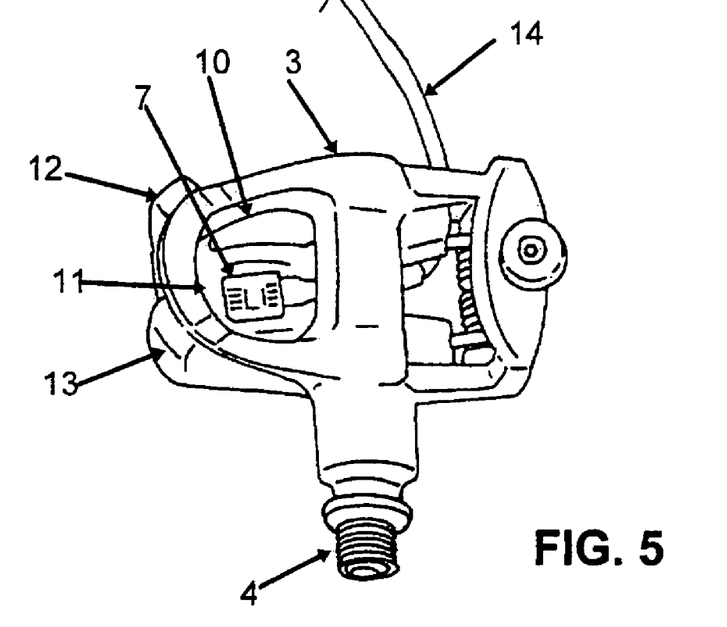
FIG. 5 shows a top view of a clipless pedal provided with a sensor and an electrical connection cable.

FIG. 5 shows that the sensor 7 is attached in a through hole 10 of the front part of the pedal 3 using a support 11 formed by a plate provided with locking lugs 12, 13 that allows the connection of the plate to the lower surface of the pedal 3. According to this embodiment, the sensor 7 is thus mounted on this stationary support 11 that is temporarily attached to the pedal 3 of the cyclist. The cyclist then uses his own pedal 3 to measure the free angular movement of the cleat 1.

In the example shown in this figure, the sensor 7 is connected by a cable 14 to a device (not shown) for storage and processing of data relating to the measurements taken. The latter can be portable and battery-powered. It can likewise be powered by the electric grid.

Figure 6:
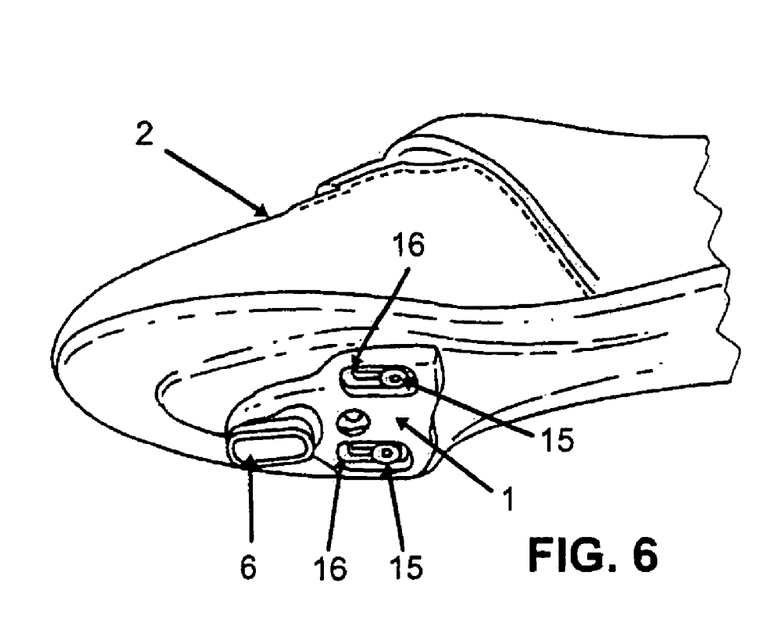
FIG. 6 is a perspective view showing the shoe of a cyclist provided with a cleat bearing a magnet according to one embodiment of the invention.

FIG. 6 shows a fastening cleat 1 attached under the shoe of the cyclist 2 using two fastening screws 15 extending through oblong holes passing to the back part of the cleat 1, allowing a certain longitudinal adjustment of the latter. A magnet 6 is attached in a third fastening hole on the front part of the cleat.

The screw heads 15 rest against oblong spacers 16 allowing a certain transverse play and for this reason easy pivoting of the cleat 1. This pivoting possibility is critical for final adjustment of the angular position of the cleat.

Moreover, the sensor 7 and the electronic module 8 can comprise an integral part of a pedal that is designed for measurement of the free angular movement of the cleat 1. This instrument-equipped pedal in this case is installed on the bicycle of the cyclist to take measurements.

This variant is especially advantageous for determining the optimum angular position for a cyclist who subsequently will use a cleat fixed in an angular position without free angular movement, i.e., with a free pivoting range equal to zero.

Figure 7:
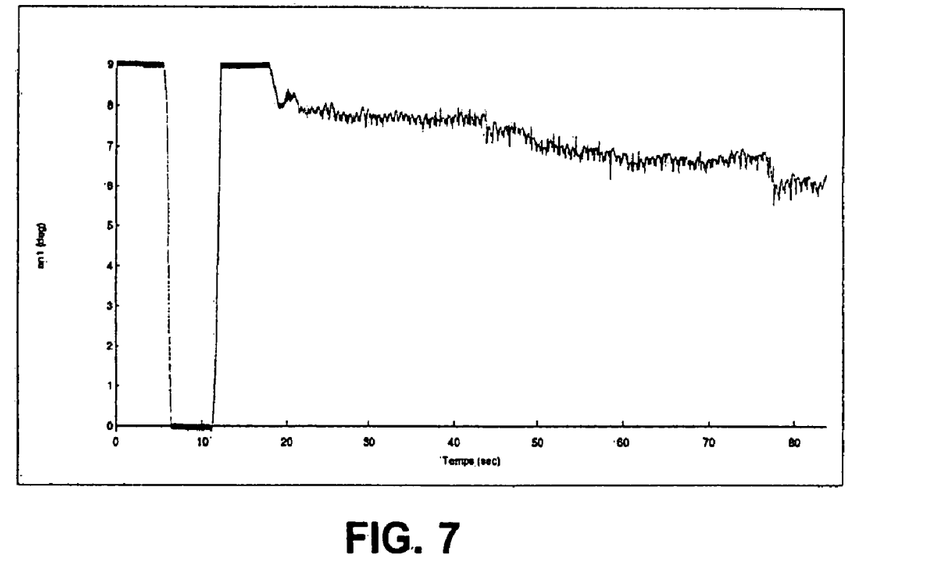
FIG. 7 is a diagram showing the results of measurements of the variations of the angular movement of the cleat, results obtained using a device according to one illustrative embodiment of the invention.

FIG. 7 illustrates the result of measurements taken with a measurement device according to the illustrative embodiment of this invention. This graph shows the amplitude of angular movement of the left foot of the cyclist as a function of time.

At the start of the measurement, the shoe 2 is moved to one end of the allowed movement to establish the zero. It is then moved to the other end in order to verify that the sensor 7 is in good working order. Two plateaus at the start of the measurement that correspond to the calibration can be noted on the graph.

The maximum amplitude of the angular movement in this example is 9 degrees; this corresponds to the amplitude of the free angular movement of the cleat 1 offered by this pedal model. It is noted during pedaling that the cyclist initially changes the orientation of his foot relative to the pedal 3 gradually.

The measurement device according to the invention thus makes it possible to measure the free angular pivoting movement of the cleat 1 and consequently of the shoe around the pivoting axis A-A as a function of time.

Figure 8:
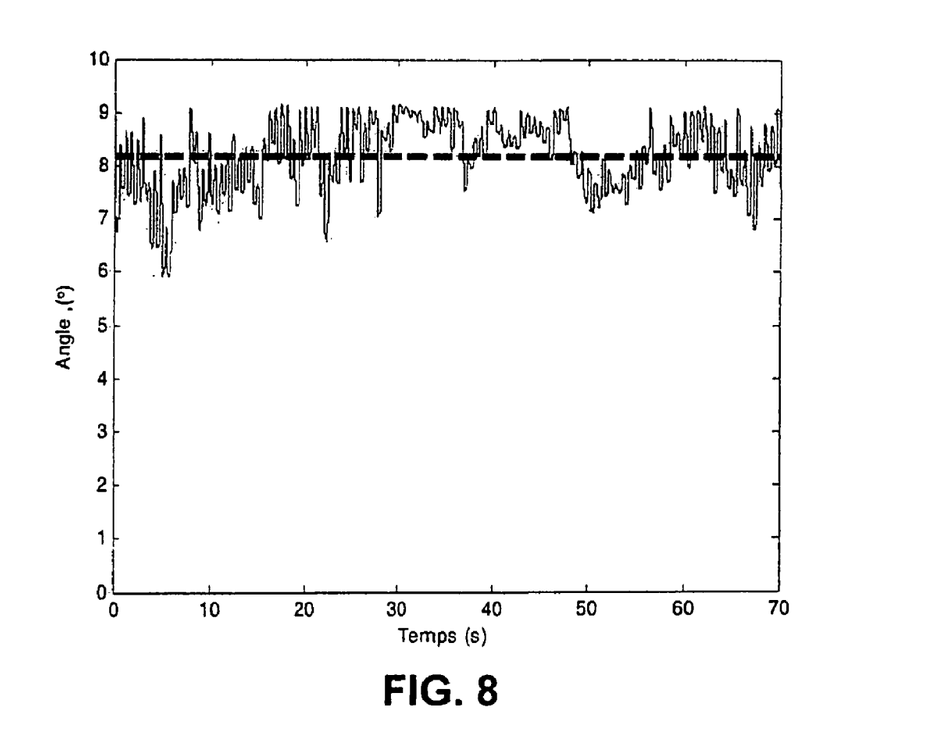
FIG. 8 is a diagram showing results of measurements allowing the calculation of the average of the variations of the angular movement of the cleat, which average is intended for adjusting the angular position of the cleat under the shoe of the cyclist.

The measurement data are recorded while the cyclist is pedaling according to a specific protocol. The diagram of FIG. 8 shows a typical result. The value of the angle equal to zero degree corresponds to the position of the left shoe turned toward the outside (heel to the inside). The cleat 1 is then just in contact with a ramp of the clipless pedal 3. The amplitude offered by the clipless pedal used for this example is 9°. For a value of the angle that is less than 0° or greater than 9°, the cyclist begins the process of removing the shoe.

FIG. 8 shows the measurement of the angular movement of the shoe of the cyclist relative to the pedal as a function of time for a period of 70 seconds. It follows from the diagram that the cyclist moves the shoe angularly with the cleat so as to bring the cleat into contact with the ramp during pedaling; this restricts its angular freedom by not using the opposing part of the range. The average measured value is 8.1° here, this value being indicated by a horizontal dotted line.

There is cause to correct this situation. The adjustment process is designed to reposition the cleat 1 angularly in order that the cyclist can use the entire useful range of the offered angular freedom. After angular adjustment of the cleat and its fastening in its corrected position, the average value would thus be around 4.5°.

Based on a long enough measurement to obtain a statistically representative average, the amplitude of the correction of the position of the cleat that is to be made is computed by subtracting 4.5° from the measured average value. A correction of 3.6° is necessary in the illustrated example.

Figure 9:
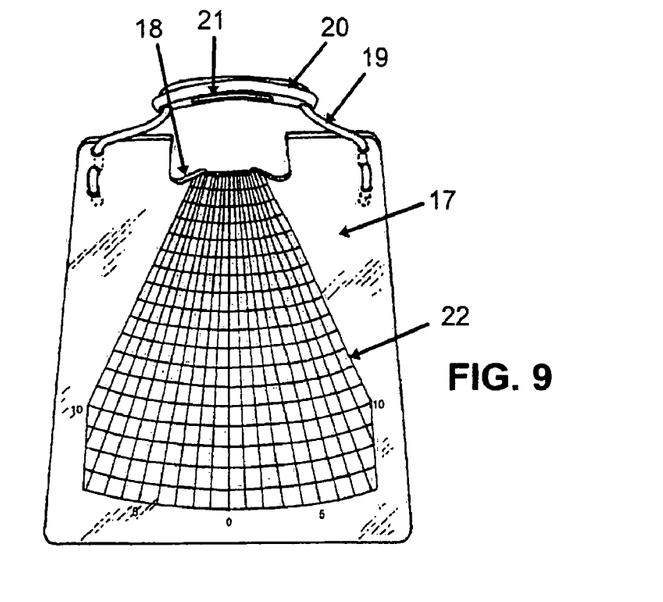
FIG. 9 shows a protractor means used to adjust the angular position of the cleat under the shoe of the cyclist.
Figure 10:
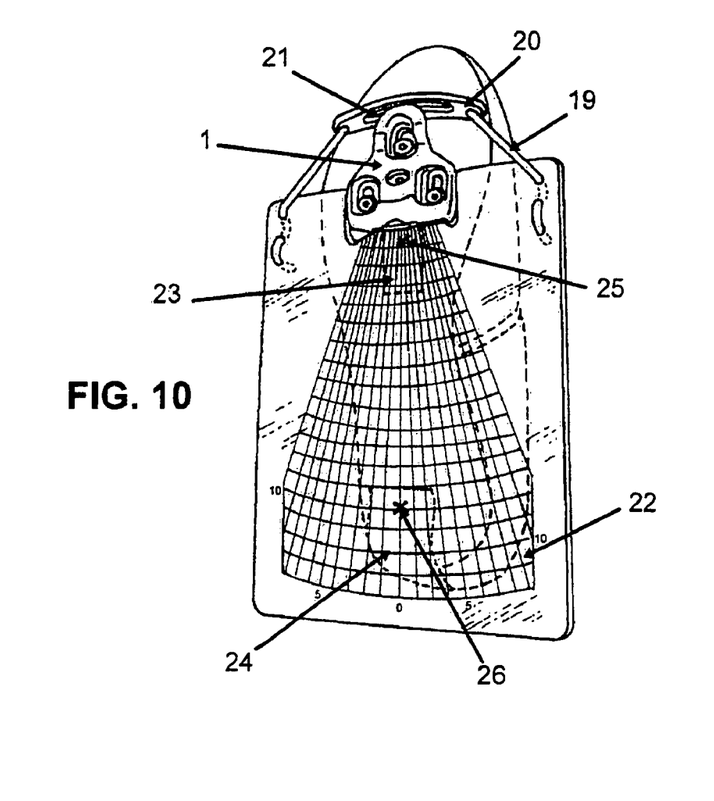
FIG. 10 shows the protractor means of FIG. 9 applied under the shoe of the cyclist and two reference points used to adjust the angular position of the cleat.

FIGS. 9 and 10 show an embodiment of a device that assists the adjustment used for exact correction or adjustment of the angular position of the cleat 1 on the shoe 2. This adjustment device comprises a protractor 17 of transparent material comprising on its front end a recess 18 that is formed to receive the back part of the cleat 1 that is then attached to the shoe of the cyclist 2.

The protractor 17 comprises means of linking the protractor to the cleat 1. These fastening means comprise an elastic band 19 whose ends are attached to the front end of the protractor 17, on both sides of the recess 18 of the latter. This elastic band 19 in its median part is connected to a rigid, elongated element 20 comprising a groove 21 constituting a housing for the front end of the cleat 1.

These connecting means make it possible to unite the protractor 17 and cleat 1 during adjustment of the angular position of the latter.

A network 22 of lines representing degrees is plotted on the protractor 17 so as to allow longitudinal, lateral and rotary movements. The extensions of the lines converge to cross at an intersection point corresponding to the pivoting axis of the cleat 1.

To adjust the angular position of the cleat 1, two labels 23, 24 are temporarily placed on the shoe, one next to the cleat 1, centered directly behind it, and the other on the heel of the shoe 2 and centered on it. A mark in the form of a cross on each of the labels serves as a first fixed reference 25 and second fixed reference 26 on the shoe 2 allowing identification of the initial angular position of the cleat 1 by a reading on the protractor 17.

The protractor is then slid into place by the back of the cleat 1 and connected to it using connecting means 19, 20. Then, the fastening screws 15 can be slightly unscrewed, holding the cleat 1 on the shoe 2 to allow it to freely move. Given that the protractor 17 is integral with the cleat 1, it follows the same movements. Thus, by using the two reference points on the labels 23, 24, the cleat 1 can be moved in a controlled manner relative to the shoe 2 and the angular position of the cleat 1 can be precisely corrected using the values displayed on the protractor.

Several alternative configurations for operation of the device for measuring the angular movement can be envisioned.

Even if only a single embodiment of the invention has been described in detail, one skilled in the art can, based on the information given above, imagine other variants without departing from the framework of the invention.

The invention claimed is:

1. A process for measuring and adjusting an angular position of a fastening cleat (1) of a shoe of a cyclist (2) on a clipless pedal (3), comprising the steps of:
   a) fixing said fastening cleat (1) in an approximate angular position under said shoe of the cyclist (2) and fastening said fastening cleat to said clipless pedal (3);
   b) providing free angular movement of said fastening cleat (1) around an essentially vertical pivoting axis (A-A) during pedaling;
   c) determining a range ($\alpha$) of said free angular movement;
   d) measuring variations of a value of said free angular movement over time during pedaling;
   e) calculating an average of the variations of the value of said free angular movement; and
   f) adjusting said angular position of said fastening cleat (1) so that said average of the variations of the value of said free angular movement is brought to a median of said range ($\alpha$) of said free angular movement.

2. The process according to claim 1, wherein for implementing the adjusting step f), a correction value is obtained by subtracting said median from said average of the variations of the value of said free angular movement.

3. The process according to claim 2, wherein for implementing the adjusting step f), a first reference point (25) is placed under the shoe (2) immediately behind said cleat (1) and centered on said cleat (1), and a second reference point (26) is placed centered on a heel of the shoe so as to allow the adjustment of said angular position of said fastening cleat (1) using a protractor (1) suited to said fastening cleat.

4. The process according to claim 1, wherein for implementing the adjusting step f), a first reference point (25) is placed under the shoe (2) immediately behind said cleat (1) and centered on said cleat (1), and a second reference point (26) is placed centered on a heel of the shoe so as to allow the adjustment of said angular position of said fastening cleat (1) using a protractor (1) suited to said fastening cleat.

5. The process according to claim 1, wherein the variations of the value of said free angular movement over time during pedaling are recorded in an onboard recording means.

6. The process according to claim 1, wherein the variations of the value of said free angular movement over time during pedaling are transmitted wirelessly to a processing device (9).

7. A device for measuring an angular position of a fastening cleat of a shoe of a cyclist (2) on a clipless pedal (3), the measurement device comprising:
   a motion detector (7) configured to be attached to the pedal (3), configured to continuously detect any angular movement of said fastening cleat (1) around a pivoting axis (A-A) on the pedal, and further configured to transmit data corresponding to a detected angular movement to a data processing device (9),
   the data processing device (9) configured to calculate i) values of said angular movement as a function of time, and ii) an average of variations of said angular movement over time.

8. The measurement device according to claim 7, wherein said detector (7) is a proximity motion detector.

9. The measurement device according to claim 8, wherein said detector comprises a magnetic sensor (7) attached to the pedal (3), arranged with respect to one or more magnets (6) fixed under said cleat (1), configured to detect any variation of an orientation of a magnetic field as a function of the angular movement of said cleat (1).

10. The measurement device according to claim 9, wherein several of the one or more magnets (6) are positioned symmetrically relative to the pivoting axis (A-A) of the cleat (1).

11. The measurement device according to claim 7, wherein said processing device (9) comprises an onboard electronic module (8) configured to carry out a preliminary processing of the data, said electronic module (8) being powered by an onboard power source.

12. The measurement device according to claim 11, wherein said electronic module (8) comprises a data storage memory.

13. The measurement device according to claim 11, wherein said electronic module (8) is configured to wirelessly transmit the processed data to a measurement data processing and display device (9).

14. The measurement device according to claim 7, wherein said measurement device is linked to an adjusting device (17) configured to be connected to the cleat (1) so as to indicate an initial angular position of the cleat fixed under the shoe (2) and allow exact correction of this position.

15. The measurement device according to claim 14, wherein said adjustment device comprises a protractor (17) with an intersection point of convergent lines representing degrees corresponding to the pivoting axis (A-A) of the cleat (1).

16. The measurement device according to claim 15, wherein said protractor (17) uses a first and a second reference point (25, 26) plotted under the shoe (2), allowing identification of the initial angular position of the cleat (1), the first reference point (25) being placed near the cleat (1) and centered directly behind the cleat (1), and the second (26) reference point (25) on the heel of the shoe (2) and centered on the shoe.

17. The measurement device according to claim 15, wherein said protractor (17) comprises a front end and a recess (18) on the front end with a shape adapted to a back part of the cleat, and wherein said protractor (17) is connected to the cleat (1) using an elastic band, a median part of the elastic band being connected to a rigid element (20) comprising a groove (21) constituting a housing for a front end of the cleat (1).

18. The measurement device according to claim 16, wherein said protractor (17) comprises a front end and a recess (18) on the front end with a shape adapted to a back part of the cleat, and wherein said protractor (17) is connected to the cleat (1) using an elastic band, a median part of the elastic band being connected to a rigid element (20) comprising a groove (21) constituting a housing for a front end of the cleat (1).

* * * * *